March 11, 1958     J. R. OISHEI     2,825,918
WINDSHIELD CLEANER DRIVE AND PARKING MECHANISM
Filed Aug. 5, 1953
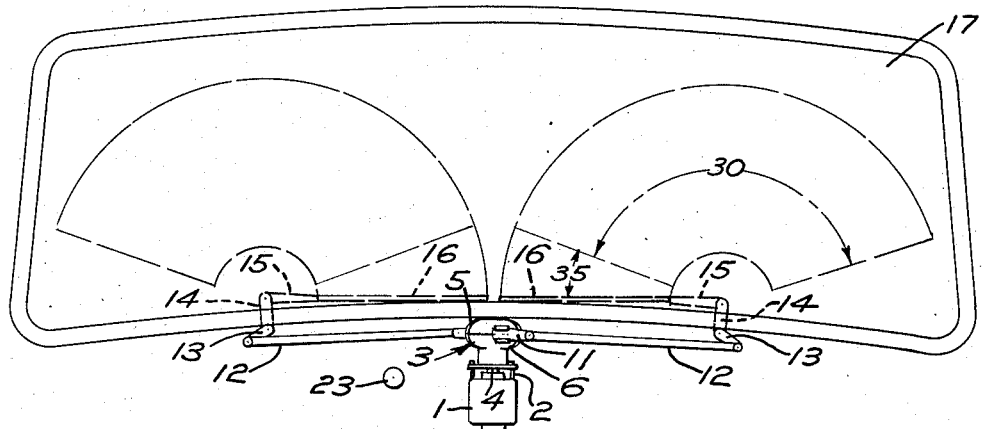
INVENTOR.
JOHN R. OISHEI
BY
Beau, Brooks, Buckley & Beau,
ATTORNEYS.

United States Patent Office 2,825,918
Patented Mar. 11, 1958

2,825,918

WINDSHIELD CLEANER DRIVE AND PARKING MECHANISM

John R. Oishei, Buffalo, N. Y., assignor to Trico Products Corporation, Buffalo, N. Y.

Application August 5, 1953, Serial No. 372,444

5 Claims. (Cl. 15—253)

This invention relates generally to the windshield cleaning art, and more particularly to a new and useful electrically operated windshield cleaner.

A prevalent deficiency of prior art windshield cleaners operated by an electric motor, as distinguished from those operated by a fluid suction motor, resides in the difficulty of arranging for parking of the wiper blades outside of the wiping path and outside the vehicle operator's normal field of vision through the windshield to the road ahead. While several arrangements have previously been proposed in an endeavor to accomplish this desired result, such prior art efforts possess various disadvantages in that they are relatively expensive or complicated, or are otherwise not completely satisfactory and acceptable for general use.

Accordingly, a primary object of this invention is to provide a new electrically operated windshield cleaner wherein the wiper blade is parked at a point beyond its normal wiping range or arc and outside the vehicle operator's normal field of vision through the windshield.

Another object of this invention is to provide an electrically operated windshield cleaner as aforesaid wherein the windshield cleaner is automatically stopped upon the wiper element or elements assuming a predetermined parked position.

It is also an object of this invention to provide an extremely practical electrically operated windshield cleaner having the aforesaid characteristics and which is relatively inexpensive to manufacture and simple in construction as well as completely reliable and durable in operation.

A windshield cleaner according to this invention comprises essentially a reversible electric motor, power output means driven in opposite directions by said reversible motor, and wiper means operatively connected to said power output means through appropriate connecting linkage including in each instance crank arm means whereby said wiper means will be oscillated through a predetermined wiping path, said crank arm means being automatically variable in length upon reversing the direction of rotation of said motor and said power output means to extend the movement of said wiper means beyond said predetermined wiping path to a predetermined parked position, together with means for automatically stopping the windshield cleaning operation upon said wiping means assuming said predetermined parked position. In a preferred embodiment the wiper actuating crank arm is radially shifted through a play connection with its driving shaft during the incipient stage of a parking reversal thereof.

The foregoing and other objects will become readily apparent upon a perusal of the ensuing detailed description, taken together with the accompanying drawing forming a part thereof wherein:

Fig. 1 is a view showing a windshield cleaner according to this invention installed in place on a vehicle;

Fig. 2 is a fragmentary plan view of the windshield cleaner of Fig. 1 showing portions of the drive mechanism thereof, certain parts being shown in section for greater clarity;

Fig. 3 is a fragmentary view in side elevation of a portion of the cleaner drive mechanism shown in parked position;

Fig. 4 is a schematic view showing the operation of the windshield cleaner drive mechanism of Fig. 3 in running position;

Fig. 5 is a sectional view of a parking switch used with the windshield cleaner of Fig. 1; and Fig. 6 is a schematic view of an electrical energizing circuit suitable for use in a windshield cleaner according to this invention.

Referring now to the preferred embodiment of a windshield cleaner according to this invention as illustrated in the accompanying drawings, there is shown a reversible electric motor 1 which may be, for example, of the shunt field type. Motor 1 is mounted, as by means of studs 2 or the like, on the lower half of a gear casing 3. A drive shaft 4, comprising a unitary shaft or two or more shaft parts connected together, extends from motor 1 into casing 3 and carries at its end within casing 3 a worm 4' engaging two spur gears 4", 4" disposed on opposite sides of said worm. Each of said gears is mounted on a shaft 7 journaled in opposite side walls of casing 3 and extending outwardly therefrom, one from one side thereof and one from the other side thereof. Gear casing 3 is divided horizontally to provide an upper and a lower section 5 and 6, respectively, to house the aforesaid worm and gears with lower section 6 providing a well-like enclosure for a suitable lubricant, and said casing is arranged to displace the gears angularly out of parallel relation with each other so as to bring their axes into substantial parallelism with the axes of the wiper shafts. It is believed that the foregoing, forming no part per se of this invention, is clear without further description or illustration, the arrangement being similar, for example, to that illustrated and described in copending application Ser. No. 316,961 now Patent No. 2,721,352.

Each of shafts 7 carries at its outer end a bushing 8 rotatable thereon and secured in position against outward axial displacement relative thereto by a flange 9 engaging a cooperating shoulder on the shaft 7. Each bushing 8 is provided on its outer face with opposed guide members 10 in the form of channels providing opposed parallel grooves slidably engaging and retaining a crank arm 11, and each of said crank arms 11 is pivotally connected adjacent its outer end to one end of a connecting link 12, said connecting links being pivotally connected at their other ends to crank arms 13 carried at corresponding ends of spaced rockshafts 14. Wiper arms 15 are mounted on the other ends of rockshafts 14, and said wiper arms carry wiper blades 16 at their other ends for oscillation across predetermined surface areas of windshield 17.

As previously set forth, a windshield cleaner according to this invention provides means for oscillating a wiper blade through a predetermined wiping path, together with means for automatically parking the wiper blade in a predetermined parked position outside said predetermined wiping path. This is accomplished in the following manner.

Each of shafts 7 is milled or otherwise formed adjacent its outer end to provide a semi-cylindrical outer end portion 18 extending outwardly between the opposed guide members 10 of bushing 8. Crank arms 11 are each provided with an opening 19 therethrough, said openings each comprising two opposed semi-circular spaces separated by an inwardly directed lug 20 providing opposed shoulders 21 terminating in inwardly inclined intersecting shoulder portions 22. The outer ends 18 of shafts 7 extend into said openings 19, and it will be noted that openings 19 are of a size such that the outer ends 18 of said shafts will fit in either side of said openings abutting either of shoulders 21 of lugs 20, said shafts 7 being rotatable relative to crank arms 11 to move said outer ends 18 from one side of lugs 20 to the other. Thus, there is provided a play or lost motion connection between shafts 7 and crank arms 11, and end portions 18 bear against and slide along the wall surfaces of openings 19 from one side of lugs 20 over the intermediate wall surfaces 19' to the other side of said lugs to radially shift the crank arms during the incipient stage of a reversal of movement of shafts 7. While only one drive shaft-crank arm connection is illustrated in detail, it should be understood that both such connections are identical. In operation, this lost motion connection between the outer ends of the drive shafts and the crank arms serves to extend the movement of the wiper blades beyond the normal wiping path thereof to a predetermined parked position in a manner to be described.

Referring now to the schematic energizing and control circuit of Fig. 6, motor 1 is energized according to the invention for selective operation in opposite directions. To this end, there is provided a manually-operable two-position switch 23 adapted for movement to a running position, illustrated in broken lines in Fig. 6, to close a first circuit to the field winding of motor 1 through a lead 24 extending from a source of electric power 25 such as, for example, the storage battery of the vehicle, and a lead 26 connected to the motor field circuit for energizing motor 1 to rotate in one direction for normal or running operation. Alternately, switch 23 is movable to a park position illustrated in solid lines in Fig. 6 wherein said switch 23 opens the motor field energizing circuit through lead 26 and closes a second circuit through lead 24 to a lead 27 connected to an automatic switch 28, to be described, which switch is connected to a lead 29 in turn connected to the motor field circuit for energizing motor 1 to rotate in the opposite direction for parking operation. Switch 28 is normally closed and is adapted to be automatically opened as the wipers assume a predetermined parked position to stop the cleaner operation at that point, as will be described. Battery 25 and motor 1 are appropriately grounded in a conventional manner, as indicated in Fig. 6.

The operation of a windshield cleaner according to this invention is as follows. When it is desired to initiate the windshield wiping action switch 23 is moved to its running position connecting leads 24 and 26 to complete a field energizing circuit therethrough for rotating motor 1 in a predetermined direction. This in turn causes drive shafts 7 to rotate in a counter-clockwise direction as viewed in Figs. 3 and 4. Referring now to Figs. 3 and 4 which illustrate a drive shaft and a crank arm in parked and running position, respectively, such counterclockwise rotation of shafts 7 will cause each shaft end 18 to rotate relative to and within the opening 19 of its crank arm until the outer ends 18 of said shafts engage shoulders 22 and then shoulders 21 on the opposite side of lugs 20 at which point said drive shafts will begin rotating crank arms 11 in a counterclockwise direction. In other words, drive shafts 7 will first rotate with lost motion from the parked position thereof illustrated in Fig. 3 to the running position thereof on the opposite side of lugs 20, illustrated in Fig. 4, and then begin rotating crank arms 11. This movement of drive shaft ends 18 to the opposite side of lugs 20 moves each crank arm 11 inwardly relative to its drive shaft 7 to thereby shorten the effective length of said crank arms, and this inward sliding movement along guide members 10 occurs at the beginning of crank arm rotation in the incipient stage of the cleaning operation, as illustrated by the broken line arrow in Fig. 3. Crank arms 11 are then rotated with the pivotal connections thereof to links 12 moving through a circular path indicated by the solid line arrow in Figs. 3 and 4, and this rotation of crank arms 11 acts through the various connecting linkage to oscillate wiper blades 16 through a predetermined wiping path indicated at 30 in Fig. 1.

When it is desired to stop the wiper operation and park the blades, switch 23 is moved to its parked position illustrated in solid lines in Fig. 6 wherein the motor field is energized in a reverse direction through leads 24, 27 and 29, and through switch 28, which switch is in its normal closed position. When motor 1 is thus energized to reverse its direction of rotation, it rotates shafts 7 in the opposite direction, clockwise as viewed in Figs. 3 and 4. This causes a reversal of the operation previously described, and shaft ends 18 will first rotate relative to crank arms 11 through their play connection therewith and sliding within openings 19 until said shaft ends engage shoulders 22 and 21 on the opposite side of lugs 20. In other words, shaft ends 18 will move relative to lugs 20 from the running position illustrated in Fig. 4 to the parking position illustrated in Fig. 3. This movement of shaft ends 18 serves to move crank arms 11 outwardly relative to drive shafts 7, the crank arms sliding along guide members 10, whereby the effective length of said crank arms is increased automatically during the incipient stage of a parking operation and they assume their full extended position illustrated for example in Fig. 3. Simultaneously with such outward movement of crank arms 11, drive shafts 7 begin rotating said crank arms, as indicated by the broken line arrow in Fig. 4.

This increase in the effective length of crank arms 11 serves to extend the path of movement of wiper blades 16 beyond the normal wiping path 30, such extension beyond one end of path 30 being indicated at 35 in Fig. 1, but they do not continue to oscillate through this enlarged path. Instead, as the wiper blades reach the inner end of said enlarged path and assume their parked position illustrated in Fig. 1, the motor energizing circuit is automatically opened to stop all wiper operation, leaving said blades in their parked position. To this end, one of crank arms 11 carries a lug 31 secured thereto in a conventional manner as by a rivet 32. Lug 31 is provided with a cam surface 33 and moves into registry with a control button 34 on switch 28 when the crank arm 11 is extended, as illustrated by broken lines in Fig. 5. Therefore, when the extended crank arm 11 passes switch 28 lug 31 engages and depresses button 34 to open said switch and thus open the motor energizing circuit. This automatically stops the wiper operation, and the arrangement is such that said lug 31 engages button 34 to open switch 28 upon wiper blades 16 reaching the innermost point of the enlarged path of movement, this being their parked position. At this point the wiper operation automatically ceases and the crank arms and connecting links are in the position illustrated in Fig. 3.

Switch 28 is of a conventional form comprising, for example, an insulating housing 36 containing a bushing 37 for slidably retaining button 34, and having a conductor 38 at its rear wall electrically connected to button 34 through a coil spring 39. Button 34 carries a flange 40 adapted to engage a second conductor, in the form of a metal plate, 41. Conductors 38 and 41 are connected in the motor energizing circuit, being connected to leads 27 and 29, and it will be observed that spring 39 normally biases flange 40 into contact with conductor 41 to complete the circuit through the switch. However, when button 34 is engaged by lug 31 it is pushed inwardly against the bias of spring 39 to break the contact between conductor 41 and flange 40 and thus open switch 28 and the energizing circuit to motor 1.

Switch 28 is mounted on casing 3 by a mounting plate 42 adjustably positioned on casing 3 as by means of screws or other equivalent means 43 extending through a groove 44 in plate 42 and into casing 3. In this way, switch 28 is adjustably positioned so as to be contacted by lug 31 when its crank arm 11 is extended.

It will be noted that lug 31 engages button 34 only when its crank arm 11 is in its fully extended position, illustrated by the full line showing in Fig. 2, and when crank arms 11 are in retracted running position lug 31 is offset from button 34 so as to avoid contact therewith, as indicated by broken lines in Fig. 2. Thus, the actuating means for switch 28 engages the same only when crank arms 11 are in fully extended position for parking purposes, and not with every revolution of crank arms 11.

Therefore, it is seen that the instant invention fully accomplishes the aforesaid objects and provides an extremely simple and practical electrically operated windshield wiper wherein the wipers are automatically parked in a predetermined position outside the normal wiping path thereof. Obviously this invention is not necessarily limited to the details of the preferred embodiment illustrated herein, but includes all such modifications and refinements thereof as fall within the skill of the art and the scope of the appended claims.

Having fully disclosed and completely described this invention, together with its mode of operation, what is claimed is:

1. A variable length crank mechanism for actuating a windshield wiper element comprising, in combination with a drive shaft rotatable in opposite directions, means providing a shoulder on said drive shaft, a crank arm adapted for connection to a wiping element and having an opening therein for receiving said drive shaft, means mounting said crank arm on said shaft for movement radially thereof, said mounting means being rotatable relative to said shaft and including parallel guides slidably receiving said crank arm, and means providing an inwardly extending lug on said arm adjacent said opening for bearing against said shoulder, said drive shaft being movable within said opening to cause said shoulder to bear against opposite sides of said lug, whereby the effective length of said crank arm will vary automatically upon reversing the direction of rotation of said shaft.

2. A window cleaner comprising, in combination, a wiper element, a reversible rotary drive shaft having a shouldered portion, and power transmitting means connecting said wiper element to said drive shaft, said means including a crank arm having an opening therein for receiving said drive shaft shouldered portion and a lug extending inwardly of said opening, and means mounting said crank arm for movement radially of said shaft including guide means rotatable relative to said shaft and slidably receiving said crank arm, said shaft being movable within said opening to bring said shouldered portion into driving engagement with opposite sides of said lug to thereby shift said crank arm in opposite directions radially of said shaft, whereby the effective length of said crank arm will vary automatically upon reversing the direction of rotation of said shaft.

3. A vehicle window cleaner comprising, in combination, a wiper element, a reversible rotary drive shaft having a substantially semi-cylindrical shouldered portion, power transmitting means connecting said wiper element to said drive shaft, said transmitting means including a crank arm having an opening therein for receiving said drive shaft shouldered portion and a lug extending inwardly of said opening, said opening comprising opposed substantially semi-cylindrical portions separated by a lug, guide means rotatable relative to said shaft and slidably receiving said crank arm for shifting movement thereof radially of said shaft, said shaft being movable within said opening to bring said shouldered portion into driving engagement with opposite sides of said lug thereby to shift said crank arm in opposite directions radially of said shaft, whereby the effective length of said crank arm will vary automatically upon reversing the direction of rotation of said shaft, a reversible electric motor driving said shaft, first circuit means for energizing said motor to rotate said shaft in one direction, second circuit means for energizing said motor to rotate said shaft in the opposite direction, first control means for selectively energizing said motor through said first and second circuit means, and second control means operable by said crank arm only when said drive shaft is rotating in a predetermined direction for automatically parking said wiper element in a predetermined position.

4. In a windshield cleaner, an actuating mechanism therefor comprising, a reversible rotary drive shaft, a crank arm connected at one end to said shaft for movement radially thereof and adapted for driving connection to a wiper element, said shaft having a generally semi-cylindrical shouldered part and said crank arm having an opening therein comprising opposed generally semi-circular portions receiving said shouldered shaft part for substantially 180° movement therein relative to said crank arm and a shoulder defining projection carried by said crank arm and extending inwardly of said opening between said opposed portions thereof for bearing against said shouldered shaft part at each end of said 180° movement thereof, said shouldered shaft part engaging said projection on opposite sides thereof to shift said crank arm in opposite directions radially of said shaft by such 180° movement, whereby the effective length of said crank arm will vary automatically upon reversing the direction of rotation of said drive shaft.

5. A window wiper actuating mechanism comprising, a reversible rotary drive shaft having a substantially semi-cylindrical shouldered part, a crank arm adapted for connection to a wiping element and having an opening therein for receiving said drive shaft, said opening comprising opposed generally semi-cylindrical portions and an intermediate portion, a lug on said arm extending into said intermediate opening portion, said shaft being freely slidable within said opening on the wall thereof and along an intermediate wall portion thereof opposite said lug to cause its shouldered part to bear against opposite sides of said lug, for moving said crank arm in opposite directions, said lug having a tapered outer end, and means mounting said crank arm on said shaft for radial sliding movement relative thereto, whereby said crank arm varies in effective length automatically upon reversing the direction of rotation of said drive shaft.

References Cited in the file of this patent
UNITED STATES PATENTS

| | | |
|---|---|---|
| 2,308,212 | Scott-Iverson et al. | Jan. 12, 1943 |
| 2,491,697 | Vischulis | Dec. 20, 1949 |
| 2,513,247 | Morton | June 27, 1950 |
| 2,651,802 | Kearful | Sept. 15, 1953 |

FOREIGN PATENTS

| | | |
|---|---|---|
| 1,014,186 | France | of 1952 |